United States Patent
Lee

(10) Patent No.: US 9,785,290 B2
(45) Date of Patent: Oct. 10, 2017

(54) TOUCH CELL STRUCTURE OF A TOUCH PANEL AND THE TOUCH PANEL USING THE SAME

(75) Inventor: Sung Ho Lee, Hwaseong-si (KR)

(73) Assignee: G2TOUCH CO., LTD., Seongnam (KR)

( * ) Notice: Subject to any disclaimer, the term of this patent is extended or adjusted under 35 U.S.C. 154(b) by 40 days.

(21) Appl. No.: 13/516,193

(22) PCT Filed: Dec. 17, 2010

(86) PCT No.: PCT/KR2010/009071
§ 371 (c)(1),
(2), (4) Date: Jun. 14, 2012

(87) PCT Pub. No.: WO2011/074911
PCT Pub. Date: Jun. 23, 2011

(65) Prior Publication Data
US 2012/0319992 A1 Dec. 20, 2012

(30) Foreign Application Priority Data
Dec. 17, 2009 (KR) .................. 10-2009-0126444

(51) Int. Cl.
*G06F 3/044* (2006.01)
*G06F 3/041* (2006.01)
*G02F 1/1333* (2006.01)

(52) U.S. Cl.
CPC ............ *G06F 3/044* (2013.01); *G06F 3/0412* (2013.01); *G02F 1/13338* (2013.01); *G06F 2203/04104* (2013.01)

(58) Field of Classification Search
CPC ........... G06F 2203/04111; G06F 3/044; G06F 3/041; G02F 1/133; G09F 9/00; G09F 9/30; G09G 3/20; G09G 3/36
See application file for complete search history.

(56) References Cited

U.S. PATENT DOCUMENTS 5,194,862 A   3/1993  Edwards
5,677,744 A * 10/1997  Yoneda et al. .................. 349/12
(Continued)

FOREIGN PATENT DOCUMENTS

KR   10-2007-0016683 A   2/2007
KR   10-2008-0075339 A   8/2008
(Continued)

OTHER PUBLICATIONS

Office Action for U.S. Appl. No. 14/811,076, dated Feb. 23, 2017.

*Primary Examiner* — Bryan Earles

(57) ABSTRACT

Provided is a touch cell structure for a touch panel in which a touch cell is configured into a new pad to gate mode in order to solve a problem of a conventional capacitive-type touch input device. The touch cell structure includes: a conductive pad that forms an electrostatic capacitance with respect to a touch unit when a finger of a human body or the touch unit having an electrical characteristic similar to the finger approaches the conductive pad within a predetermined distance; and a three-terminal type switching device whose gate terminal is connected with the conductive pad and whose output signal is changed in correspondence to a change in electric potential of the gate terminal of the three-terminal type switching device by the electrostatic capacitance between the touch unit and the conductive pad. Since the potential of the gate terminal of the switching device is determined by an electrostatic capacitance formed in the conductive pad, a difference of the output signal output from the switching device becomes large depending on whether a touch input occurs or not.

14 Claims, 14 Drawing Sheets

(56) References Cited

U.S. PATENT DOCUMENTS

| | | | |
|---|---|---|---|
| 5,760,715 A * | 6/1998 | Senk | H03K 17/9622 178/18.05 |
| 6,518,820 B2 | 2/2003 | Gremm | |
| 8,593,159 B2 | 11/2013 | Seeburger | |
| 2003/0016070 A1 * | 1/2003 | Yang | 327/390 |
| 2005/0134294 A1 * | 6/2005 | Ebihara | G01D 5/24 324/662 |
| 2007/0030255 A1 * | 2/2007 | Pak et al. | 345/173 |
| 2007/0076393 A1 * | 4/2007 | Jeong et al. | 361/767 |
| 2008/0238444 A1 * | 10/2008 | Klopfer | 324/662 |
| 2011/0050585 A1 * | 3/2011 | Hotelling et al. | 345/173 |

FOREIGN PATENT DOCUMENTS

| | | |
|---|---|---|
| KR | 10-2009-0000484 A | 1/2009 |
| KR | 10-0909265 B1 | 7/2009 |

\* cited by examiner

[FIG. 1]
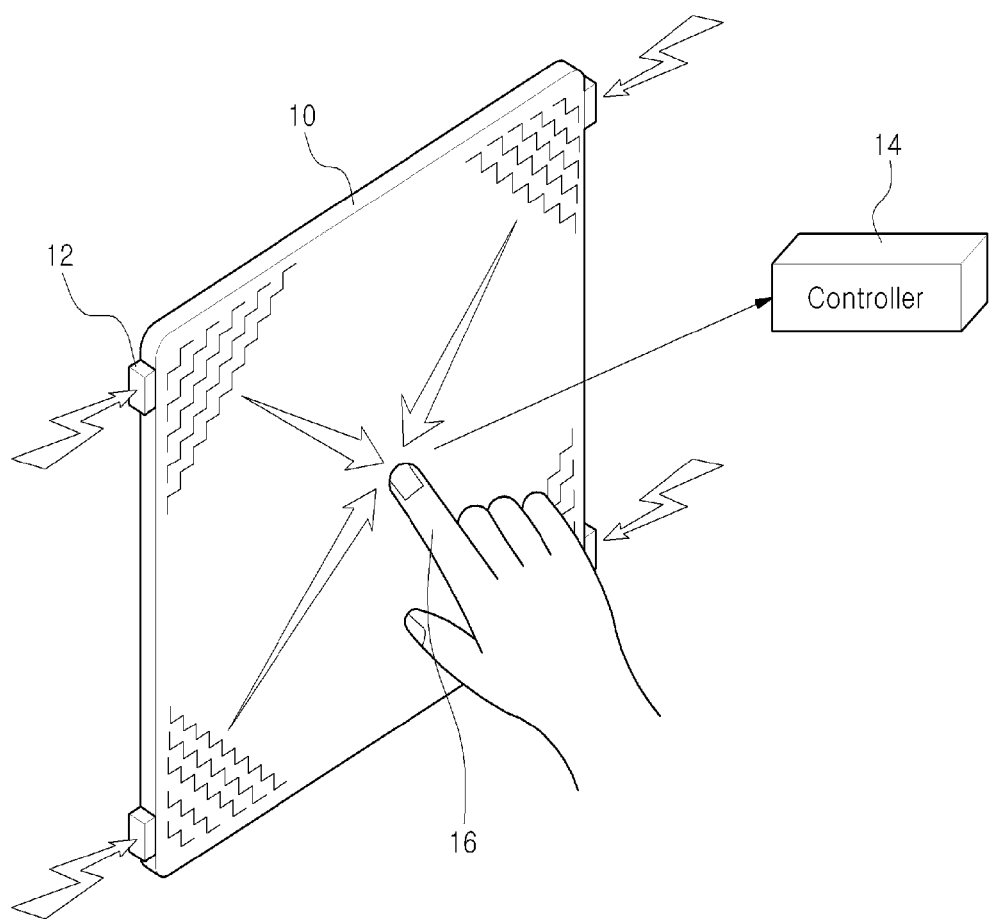

[FIG. 2]
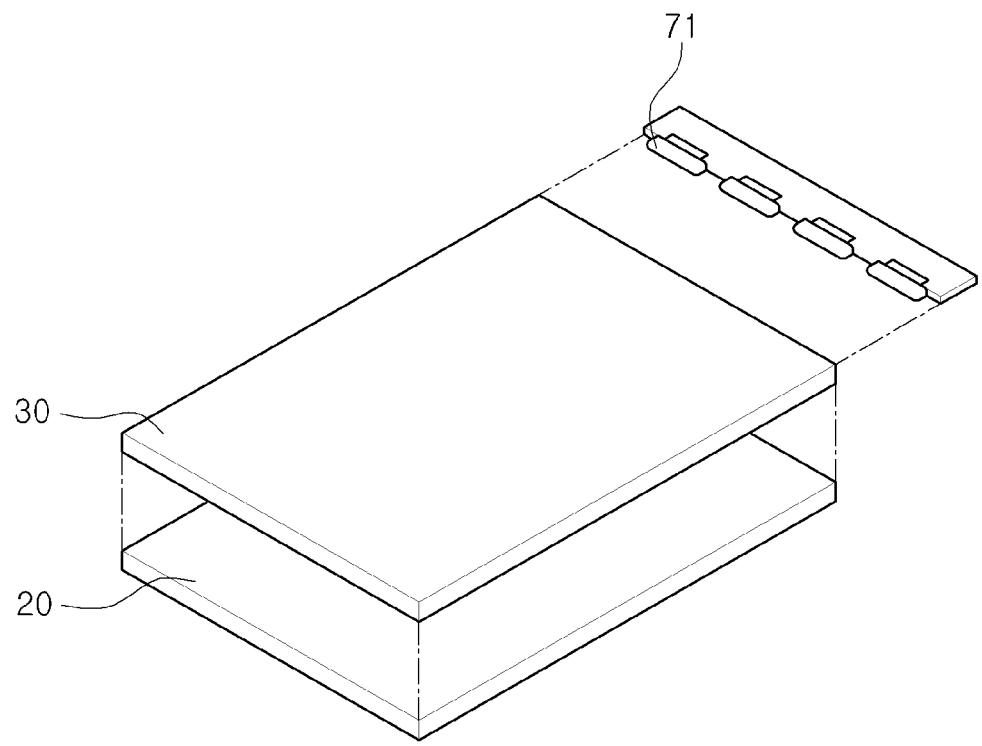

[FIG. 3]
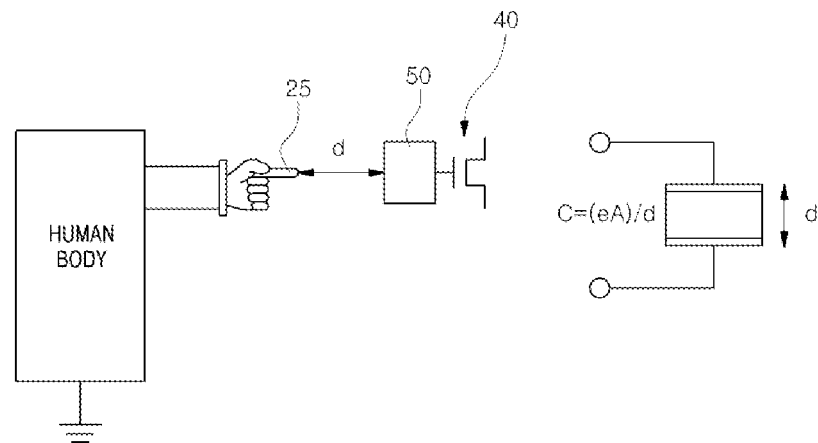
[FIG. 4]
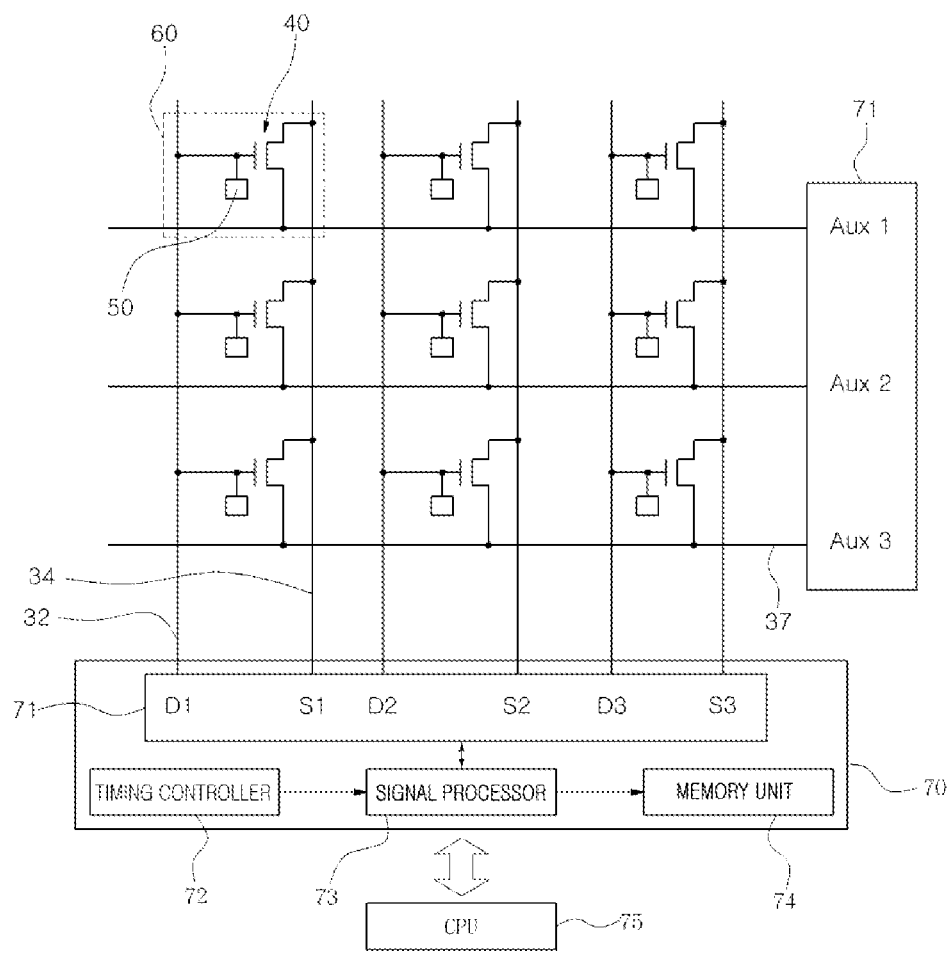

[FIG. 5]

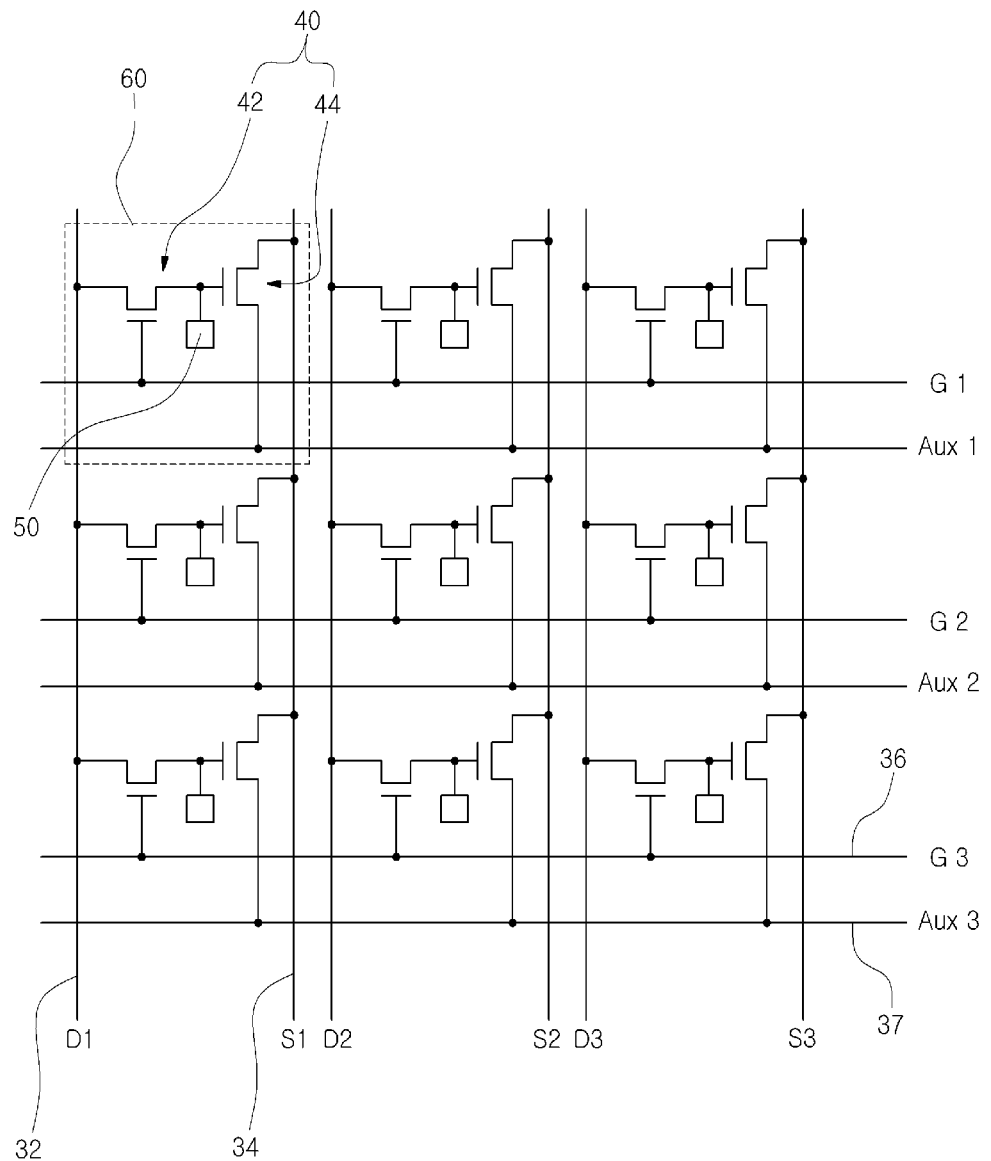

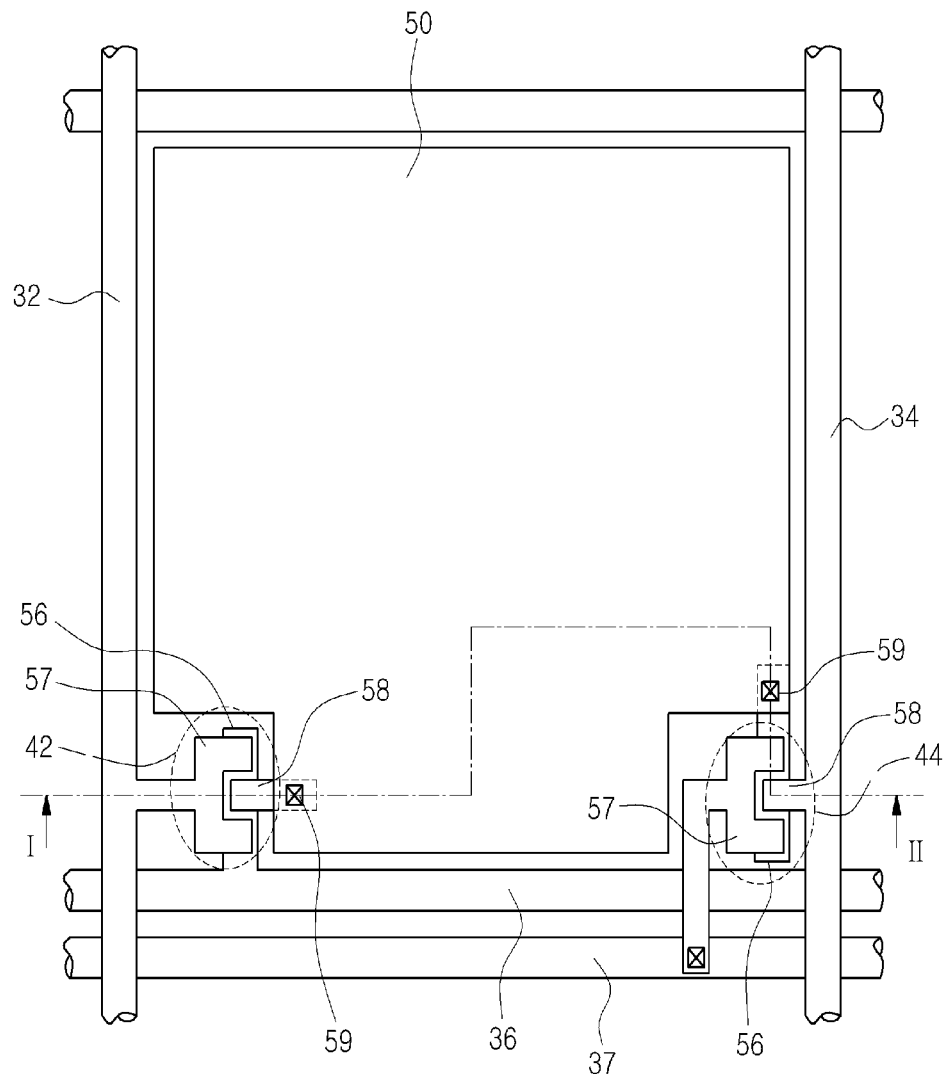
[FIG. 7]

[FIG. 8]
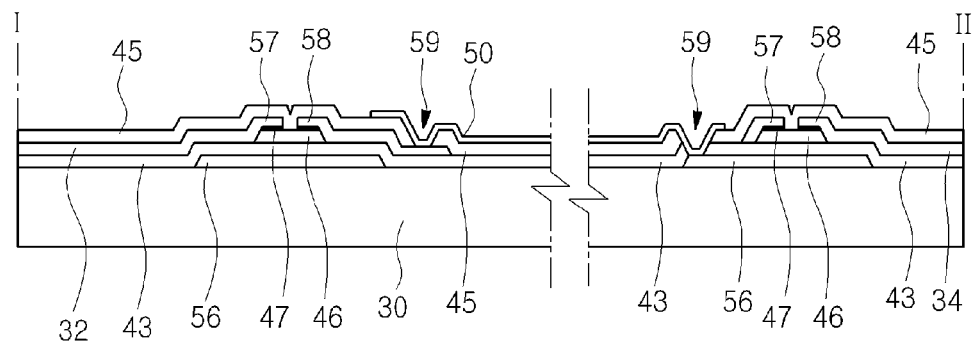
[FIG. 9]
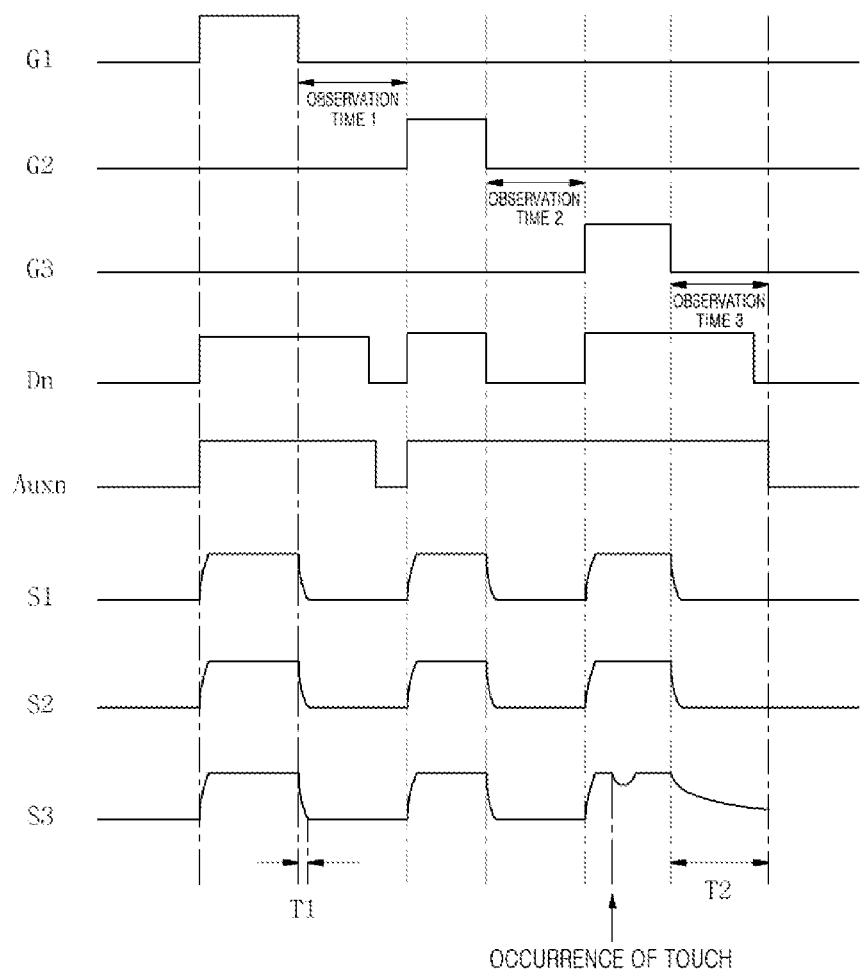

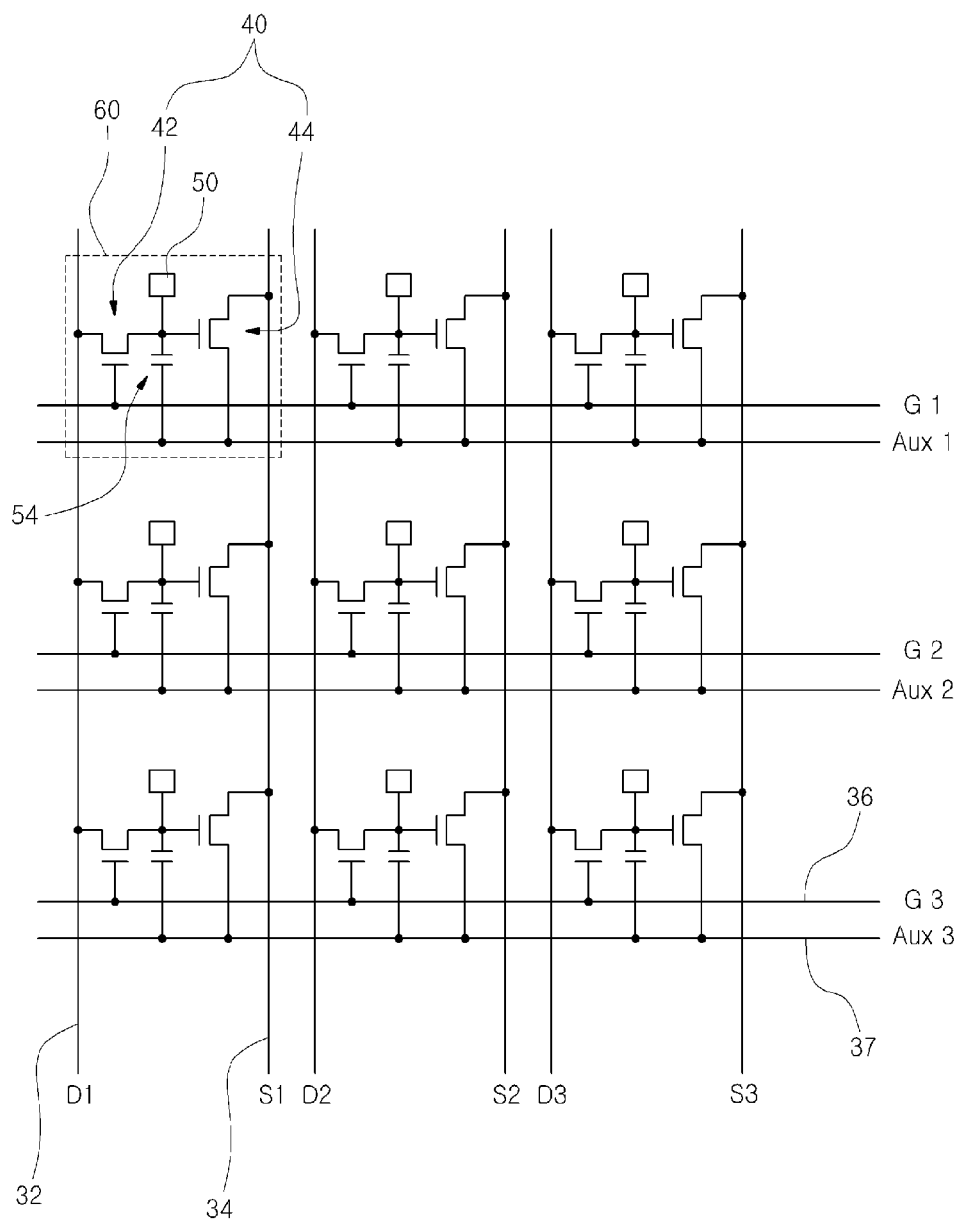
[FIG. 10]

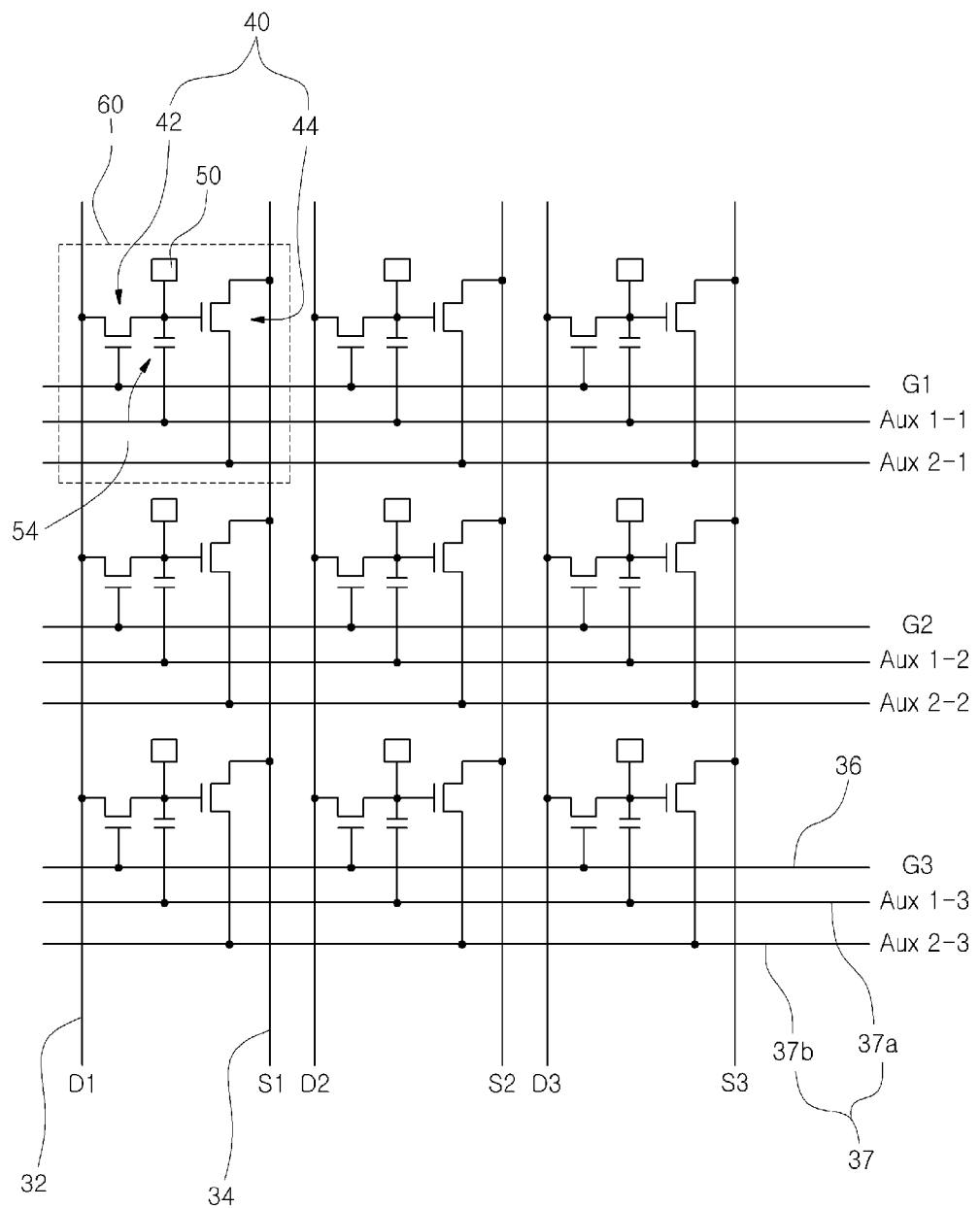
[FIG. 11]

[FIG. 12]
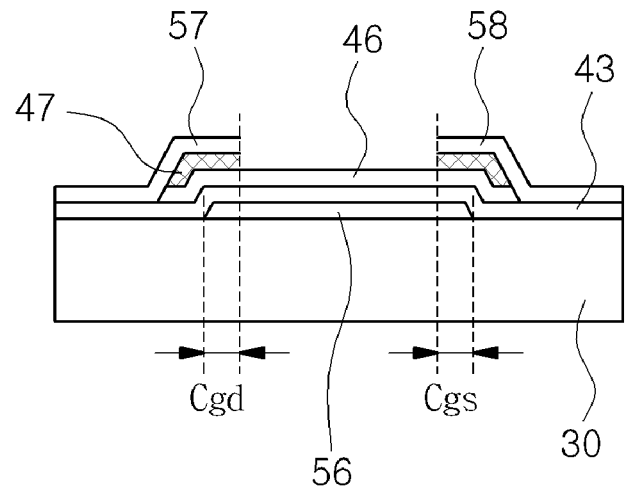
[FIG. 13]
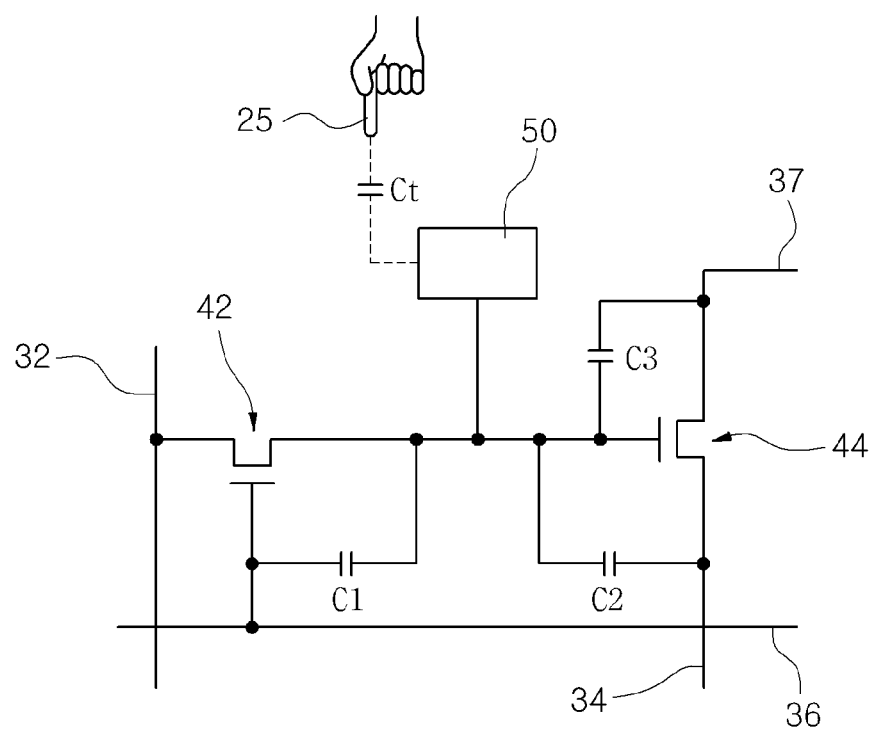

[FIG. 14]
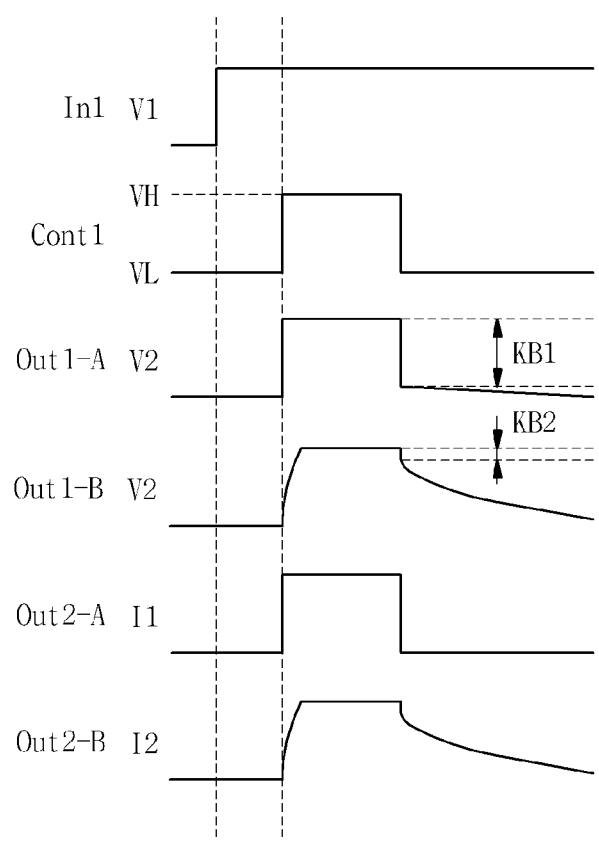

[FIG. 15]
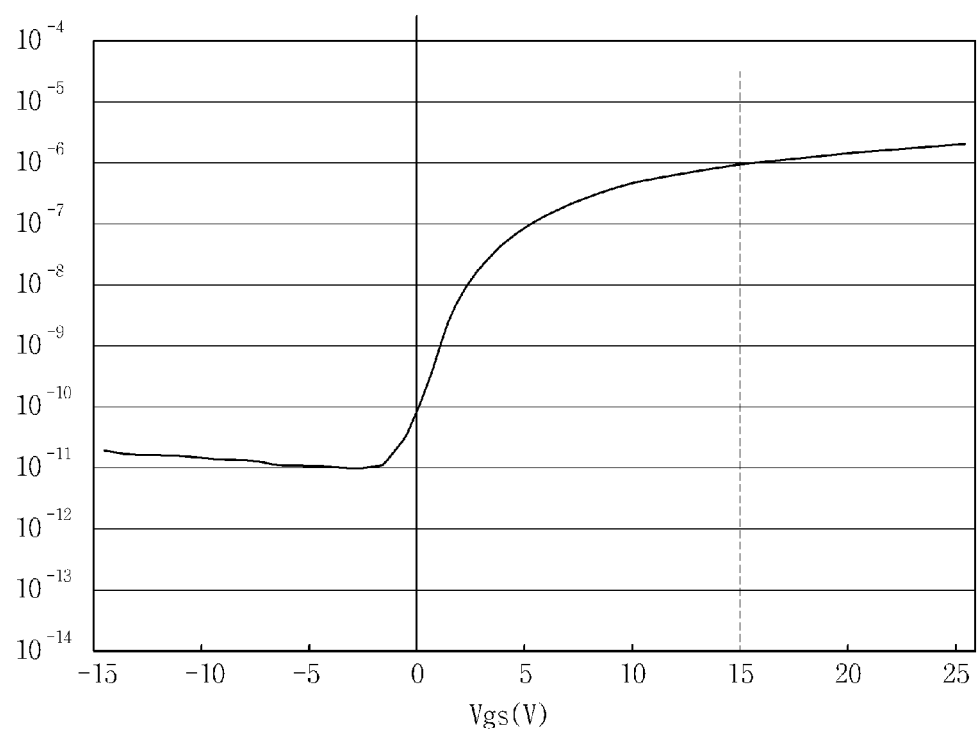

[FIG. 16]
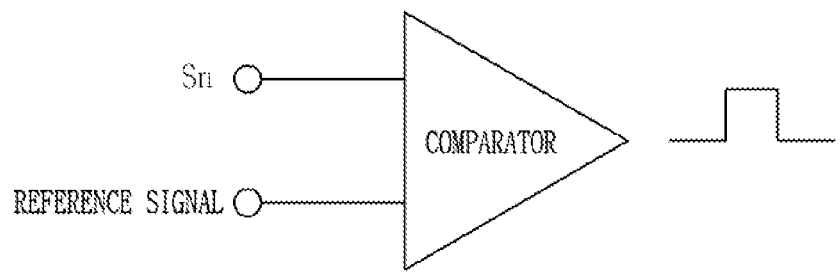
[FIG. 17]
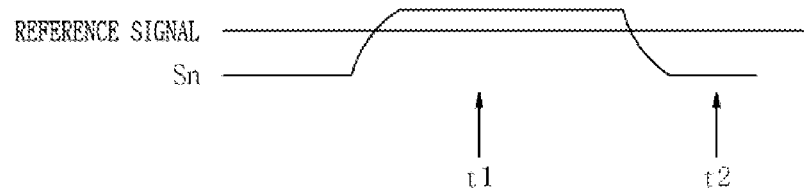
[FIG. 18]
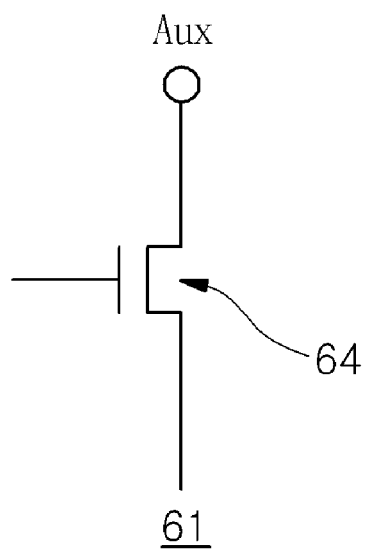

[FIG. 19]
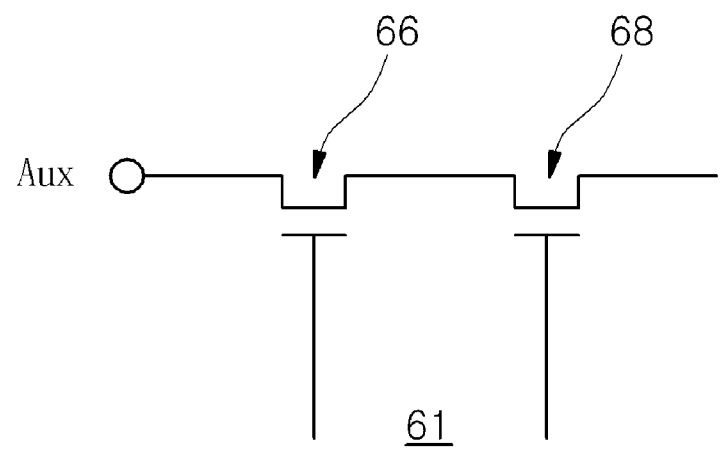

TOUCH CELL STRUCTURE OF A TOUCH PANEL AND THE TOUCH PANEL USING THE SAME

TECHNICAL FIELD

The invention relates to a touch cell structure of a touch panel and the touch panel using the same, and more particularly, to a touch cell structure having a very high detection sensitivity and accuracy for touch inputs as a specialized cell configuration, and employing a new pad to gate mode that can detect touch inputs in a digital mode and recognize multi-touch inputs and a touch panel using the same.

BACKGROUND ART

Usually, touch input devices are input devices which are respectively attached onto display devices such as LCDs (Liquid Crystal Displays), PDPs (Plasma Display Panels), OLED (Organic Light Emitting Diode) displays, and AMO-LED (Active Matrix Organic Light Emitting Diode) displays or which are respectively built in the display devices and recognize touch input signals when an object such as a finger or pen contacts a respective screen on touch panels.

Recent years, the touch input devices are respectively mounted on mobile devices such as mobile phones, PDAs (Personal Digital Assistants) or PMPs (Portable Multimedia Players). Besides, touch input devices are being used over all industries such as navigation terminals, netbook computers, notebook computers, DIDs (Digital Information Devices), desktop computers that use touch input supporting operating systems, IPTVs (Internet Protocol TVs), the most advanced fighter aircrafts, tanks, and armored vehicles.

Various types of conventional touch input devices are disclosed, but resistive-type touch input devices having simple manufacturing processes and inexpensive manufacturing costs have been used most widely. The resistive-type touch input devices or touch panels, however, have low transmittance and undergo the pressure applied to respective substrates, to thereby cause problems that inevitable loss of durability occurs over lapse of use time, it is difficult to accurately perceive touch points, and detection errors occur frequently due to surrounding environments such as temperature and the noise.

Capacitive-type or electrostatic capacitive-type touch input devices that are developed as an alternative to the resistive-type touch input devices detect touch inputs in a non-contact mode and have a solution to various problems of the resistive-type touch input devices.

FIG. 1 shows the structure of a conventional electrostatic capacitive-type touch panel. Referring to FIG. 1, the conventional capacitive-type touch panel includes transparent conductive films that are formed on the top and bottom surfaces of a transparent substrate 10 made of film, plastic or glass. Metal terminals 12 for applying voltage are formed at each of four corners of the transparent substrate. The transparent conductive film is formed of transparent metal such as ITO (Indium Tin Oxide) or ATO (Antimony Tin Oxide). The metal terminals 12 respectively formed at the four corners of the transparent conductive film are formed by printing low resistivity conductive metal such as silver (Ag). Resistor network is formed around the metal terminals 12. The resistor network is formed in a linearity pattern in order to transmit a control signal equally on the entire surface of the transparent conductive film. A protective film is coated on top of the transparent conductive film including the metal terminals 12.

The capacitive-type touch panels operate as follows. A high-frequency alternating-current (AC) voltage applied to the metal terminals 12, is spread to the whole surface of the transparent substrate 10. Here, if a finger 16 for a conductive material touch means) lightly touches the top surface of a transparent conductive film of a transparent substrate 10, an amount of electric current is absorbed into the human body and changes in the electric current are detected by a built-in electric current sensor of a controller 14, to thus calculate the amount of electric current at the four metal terminals 12, respectively, and to thereby recognize a touch point.

The capacitive-type touch panel employs a soft touch mode to thus have a long life, uses only a sheet of the transparent substrate 10, to thus have a high light transmittance, and makes a special metal coating treatment on a contact surface thereof, to thus have an advantage of robustness. In particular, the capacitive-type touch panel has a narrow width of a non-active area which makes it impossible to detect touch inputs at the panel edge portions, to thus have an advantage of enabling a mechanical instrument to be made in a slim form at the time of being coupled with a display device.

However, the electrostatic capacitive-type touch panel needs an expensive detector in order to detect a magnitude of minute electric current, and further needs an analog-to-digital (ADC) converter for converting detected analog electric current to digital electric current, to accordingly cause an inevitable price increase. In addition, there may raise a problem that a response time is prolonged due to the time consumed for converting analog signals to digital signals. Above all, since a difference in magnitude between an electric current detected when a touch input occurs and a usual electric current measured before the touch input is very small, there may cause bad detection sensitivity and high noise sensitivity. For example, assuming that a magnitude of electric current that is leaked from one of the metal terminals 12 when no touch input occurs is 1 µA and a magnitude of electric current that is leaked from the same one metal terminal 12 when a touch input occurs is 2 µA, detection of the difference between the minute electric currents by using a circuitry means may cause degradation of accuracy and signal recognition errors due to noise.

DISCLOSURE

Technical Problem

In order to solve the above-mentioned problems of requiring for a complex configuration to detect minute signal changes due to a touch input in a conventional electrostatic capacitive touch input device, it is an object of the present invention to provide a touch cell structure enlarging a difference between detection signals depending upon touch inputs and accordingly having a very high detection sensitivity and accuracy for touch inputs as a unit touch cell constituting a touch input device has a specialized circuitry configuration, and employing a new mode that can detect touch inputs in a digital mode without using an expensive component such as an analog-to-digital (ADC) converter to thus greatly reduce a response time, remove a misrecognition due to noise and recognize multi-touch inputs and a touch panel using the same.

Technical Solution

To attain the above object of the present invention, according to an aspect of the present invention, there is provided a touch cell structure constituting a unit touch cell 60 in a touch panel, the touch cell structure comprising:

a conductive pad 50 that forms an electrostatic capacitance with respect to a touch unit when a finger 25 of a human body or the touch unit having an electrical characteristic mar to the finger approaches the conductive pad 50 within a predetermined distance "d"; and a three-terminal type switching device 40 whose gate terminal is connected with the conductive pad 50 and whose output signal is changed in correspondence to a change in electric potential of the gate terminal of the three-terminal type switching device 40 by the electrostatic capacitance between the touch unit and the conductive pad 50.

Preferably but not necessarily, the switching device 40 comprises:

a first three-terminal type switching unit 42 whose output signal is connected with the conductive pad 50, and that is turned on/off according to a control signal applied to a gate terminal of the first three-terminal type switching unit 42, to thereby supply a charging signal to the conductive pad 50; and a second three-terminal type switching unit 44 whose gate terminal is connected with the conductive pad 50 and whose output signal is changed in correspondence to a change in electric potential of the gate terminal of the three-terminal type switching unit 44.

Preferably but not necessarily, the touch cell structure further comprises capacitors C1 and C2 that are connected between the control terminal and the output terminal of the first three-terminal type switching unit 42 and the second three-terminal type switching unit 44, respectively.

Preferably but not necessarily, the capacitor C1 connected between the control terminal and output terminal of the first three-terminal type switching unit 42 is in the range of 10 fF to 100 uF.

Preferably but not necessarily, the capacitor C1 connected between the control terminal and the output terminal of the first three-terminal type switching unit 42 is selected to have a smaller value by twice to several hundreds of times than a value of a capacitor Ct formed between the touch unit and the touch pad 50.

Preferably but not necessarily, the capacitor C1 connected between the control terminal and the output terminal of the first three-terminal type switching unit 42 is selected to have a value or more of a capacitor Ct formed between the touch unit and the touch pad 50.

Preferably but not necessarily, the capacitors C1 and C2 are built in the first three-terminal type switching unit 42 and the second three-terminal type switching unit 44, respectively.

Preferably but not necessarily, the capacitors C1 and C2 are provided in the outside of the first three-terminal type switching unit 42 and the second three-terminal type switching unit 44, respectively.

Preferably but not necessarily, the touch cell structure further comprises a capacitor C3 connected between the input terminal and control terminal of the second three-terminal type switching unit 44.

Preferably but not necessarily, the touch cell structure further comprises an auxiliary capacitor 54 between the conductive pad 50 and the ground.

Preferably but not necessarily, the switching device 40 is any one selected from the group consisting of a relay, a MOS (Metal Oxide Semiconductor) switch, a BJT (Bipolar Junction Transistor) switch, a FET (Field Effect Transistor) switch, a MOSFET (Metal Oxide Semiconductor Field Effect Transistor) switch, an IGBT (Insulated Gate Bipolar Transistor) switch, and a TFT (Thin Film Transistor) switch.

To achieve the above object, according to another aspect of the present invention, there is provided a touch panel comprising:

a light transmissive substrate 30;

touch cells 60 that are arranged in a matrix form on the light transmissive substrate 30, in which each touch cell comprises a conductive pad 50, and a three-terminal type switching device 40 whose gate terminal is connected with the conductive pad 50 and whose output signal is changed in correspondence to a change in electric potential of the gate terminal of the three-terminal type switching device 40 by an electrostatic capacitance between a finger 25 of a human body or a touch unit having an electrical characteristic similar to the finger and the conductive pad 50; and a touch position detector 70 that recognizes a touch input from the output of the switching device 40.

Preferably but not necessarily, the switching device 40 comprises:

a first three-terminal type switching unit 42 whose output signal is connected with the conductive pad 50, and that is turned on/off according to a control signal applied to a gate terminal of the first three-terminal type switching unit 42, to thereby supply a charging signal to the conductive pad 50; and a second three-terminal type switching unit 44 whose gate terminal is connected with the conductive pad 50 and whose output signal is changed in correspondence to a change in electric potential of the gate terminal of the three-terminal type switching unit 44.

Preferably but not necessarily, the touch panel further comprises capacitors C1 and C2 that are connected between the control terminal and the output terminal of the first three-terminal type switching unit 42 and the second three-terminal type switching unit 44, respectively.

Preferably but not necessarily, the capacitor C1 connected between the control terminal and output terminal of the first three-terminal type switching unit 42 is in the range of 10 fF to 100 uF.

Preferably but not necessarily, the capacitor C1 connected between the control terminal and the output terminal of the first three-terminal type switching unit 42 is selected to have a smaller value by twice to several hundreds of times than a value of a capacitor Ct formed between the touch unit and the touch pad 50.

Preferably but not necessarily, the capacitor C1 connected between the control terminal and the output terminal of the first three-terminal type switching unit 42 is selected to have a value or more of a capacitor Ct formed between the touch unit and the touch pad 50.

Preferably but not necessarily, the capacitors C1 and C2 are built in the first three-terminal type switching unit 42 and the second three-terminal type switching unit 44, respectively.

Preferably but not necessarily, the capacitors C1 and C2 are provided in the outside of the first three-terminal type switching unit 42 and the second three-terminal type switching unit 44, respectively.

Preferably but not necessarily, the touch panel further comprises a capacitor C3 connected between the input terminal and control terminal of the second three-terminal type switching unit 44.

Preferably but not necessarily, the touch panel further comprises an auxiliary capacitor 54 between the conductive pad 50 and the ground.

Preferably but not necessarily, the switching device 40 is any one selected from the group consisting of a relay, a MOS (Metal Oxide Semiconductor) switch, a BJT (Bipolar Junction Transistor) switch, a FET (Field Effect Transistor) switch, a MOSFET (Metal Oxide Semiconductor Field Effect Transistor) switch, an IGBT (Insulated Gate Bipolar Transistor) switch, and a TFT (Thin Film Transistor) switch.

Preferably but not necessarily, the touch position detector 70 applies an on/off control signal to a control terminal of the first switching unit 42, applies a position detection signal to an input terminal thereof, and compares a difference of an output signal of the second switching unit 44 according to a difference of a kick back depending upon whether or not a touch input exists, to thus recognize the touch input.

Preferably but not necessarily, the output signal of the second switching unit 44 has tens of times or tens of thousands of times a difference depending upon whether or not a touch input exists.

Preferably but not necessarily, the touch panel further comprises a comparator for comparing the output signal of the second switching unit 44 and a reference signal.

Preferably but not necessarily, a sensing cell 61 including a three-terminal sensing switching unit 64, which has the same circuit configuration as the second switching unit 44 but to the control terminal of which the conductive pad 50 is not connected, is further provided at one side of the substrate 30, the touch position detector 70 applies a control signal corresponding to a value positioned between a signal applied to the control terminal of a second TFT 44 of the touch cell 60 at the time of no occurrence of touch inputs and a signal applied to the control terminal of the second TFT 44 of the touch cell 60 at the time of occurrence of touch inputs, to the control terminal of the sensing switching unit 64, the same signal as the signal applied to the input terminal of the second TFT 44 is applied to the input terminal of the sensing switching unit 64, and the signal output from the output terminal of the sensing switching unit 64 is used as a reference signal of the comparator.

Preferably but not necessarily, the touch position detector 70 further comprises a memory unit 74 having addresses corresponding to the coordinates of the touch cell 60, in which if a touch input is detected, coordinate values of the corresponding touch cell 60 are stored in the corresponding addresses of the memory unit 74.

Advantageous Effects

A touch cell structure and a touch panel using the same according to the present invention, includes a conductive pad that forms an electrostatic capacitance with respect to a finger of a human body or the touch unit having a conductive characteristic similar to the finger, and a three-terminal type switching device whose gate terminal is connected with the conductive pad, that is, the touch cell structure is configured into a P2G (Pad to Gate) mode in which the gate terminal of the three-terminal type switching device is connected with the conductive pad. Accordingly, an electrostatic capacitance Ct formed between the touch unit and the conductive pad determines an electric potential of the gate terminal of the switching device, and the output signal of the switching device has tens of times or tens of thousands of times a difference depending upon whether or not a touch input exists. Thus, detection sensitivity and detection accuracy with respect to the touch input are very high, and the touch input can be detected as a high/law level of the output signal, to thus detect the touch input in a digital mode unlike the conventional touch panel structure using an analog to digital (ADC) converter. In addition, the touch cell structure has a very fast response speed with respect to a touch input signal and has little influence due to noise, and thus does not raise a malfunction and a false-recognition of a signal but enables an independent operation of each touch cell in an active matrix (AM) mode in which each touch cell operates actively, and a recognition of a multi-touch input that is simultaneously touched at a plurality of touch points. In addition, the touch cell structure has a specialized cell structure to thus enable a gap between cells to become minute and to thereby provide an effect of promoting development of an application using touch inputs as well as enabling a touch input support with respect to a variety of applications.

DESCRIPTION OF DRAWINGS

The above and other objects and advantages of the invention will become more apparent by describing the preferred embodiments with reference to the accompanying drawings in which:

FIG. 1 is a perspective view showing an example of a conventional capacitive-type touch panel;

FIG. 2 is an exploded perspective view showing structure of a touch panel according to the present invention;

FIG. 3 is a conceptual drawing depicting a method of detecting a touch input in the present invention;

FIG. 4 is a diagram showing a touch cell structure in accordance with a basic embodiment of the present invention;

FIG. 5 is a conceptual block diagram showing a memory unit according to an embodiment of the present invention;

FIG. 6 shows a configuration according to a preferred embodiment of the present invention;

FIG. 7 is a plan view showing structure of a unit touch cell structure in the embodiment of FIG. 6;

FIG. 8 is a cross-sectional view cut along a line I-II of FIG. 7;

FIG. 9 is a waveform diagram illustrating an example of detecting touch inputs according to the embodiment of FIG. 6;

FIG. 10 shows a configuration according to another embodiment of the present invention;

FIG. 11 shows a configuration according to a modified embodiment of FIG. 10;

FIG. 12 is a cross-sectional view showing an example of capacitors internally designed in a TFT;

FIG. 13 shows a configuration of a touch cell illustrating a state where capacitors are internally designed in a TFT;

FIG. 14 is a waveform diagram illustrating examples of kick back waveform depending upon whether or not a touch input exists;

FIG. 15 is a graphical view showing a gate voltage versus output current characteristic of a TFT;

FIG. 16 is a diagram showing an example of detecting a touch input using a comparator;

FIG. 17 is a waveform diagram illustrating waveform at the time of detection using a comparator;

FIG. 18 is a circuitry diagram illustrating a configuration of a sensing cell; and FIG. 19 is a circuitry diagram showing another example of the sensing cell.

BEST MODE

Hereinbelow, a touch cell structure and a touch panel using the same according to preferred embodiments of the present invention will be described with reference to the accompanying drawings.

First, the present invention relates to a touch cell structure for a touch panel that is added on an upper surface of a display device such as LCD (Liquid Crystal Display), PDP (Plasma Display Panel), OLED (Organic Light Emitting Diode), and AMOLED (Active Matrix Organic Light Emitting Diode), or that is built in the display device, and a touch panel using the touch cell structure. The touch cell structure according to the present invention means a structure of respective unit touch cells in a cell type touch input device in which an active area that enables an actual touch input on a touch panel is divided into a plurality of sub-areas, and thus a plurality of touch cells are arranged in a matrix pattern.

Each unit touch cell structure includes a conductive pad that forms an electrostatic capacitance relative to a finger or a touch unit having a conductive characteristic similar to that of the finger, and a three-terminal type switching device whose gate terminal is connected to the conductive pad. Here, the touch cell structure specialized according to the present invention is called a P2G (Pad to Gate) type since an electric potential of the gate terminal of the switching device is determined by the electrostatic capacitance of the conductive pad, or is called a F2G (Finger to Gate) type since the electric potential of the gate terminal of the switching device is varied by the capacitance produced by the finger. It will be easily understood that a P2G or F2G type touch cell structure according to the present invention differs from the conventional electrostatic capacitive type touch panel by the above-described naming scheme.

The switching device is equipped with a three-terminal type configuration having a gate terminal that can control a turn-on/off operation. The three-terminal type switching device is used to detect a signal output from each touch cell. In another embodiment, an additional switching device for switching a charging signal applied to each touch cell may be further needed. For example, the three-terminal type switching device is a control device for controlling conduction of an input/output terminal in accordance with a control signal applied to the control terminal of the switching device, and may be any one selected from the group consisting of a relay, a MOS (Metal Oxide Semiconductor) switch, a BJT (Bipolar Junction Transistor) switch, a FET (Field Effect Transistor) switch, a MOSFET (Metal Oxide Semiconductor Field Effect Transistor) switch, an IGBT (Insulated Gate Bipolar Transistor) switch, and a TFT (Thin Film Transistor) switch. The relay is a switching device that outputs a voltage or current applied to an input terminal thereof with no loss when a current is applied to a control terminal thereof. The BJT switch is a switching device that a certain amount of amplified current flows from the collector thereof to the emitter thereof when current flows to the base thereof at a state where a voltage higher than a threshold voltage of the base thereof is applied to the base. In addition, the TFT switch is a switching device that is used in a pixel unit constituting a display device such as LCD or AMOLED, including a gate terminal as a control port, a drain terminal as an input port, and a source terminal as an output port, in which the TFT switch is conducted when a voltage above a threshold voltage larger than the voltage applied to the source terminal is applied to the gate terminal and a current dependent on a magnitude of the voltage applied to the gate terminal flows from the input port to the output port.

On the following description, an example of using the TFT as a switching device will be described, in which identical reference numerals are given to the switching device and the TFT. Switching a signal in each touch cell using the TFT is similar to constituting a pixel for a screen display using the TFT in LCD, AMLCD (Active Matrix LCD) or AMOLED. In other words, the touch cells 50 that are described in the present invention detect touch inputs in an active matrix type. The technical advantages of the touch panel include excellent mass-production and good reliability, and prevention of a backflow of a signal to thus prevent touch inputs from being misrecognized and to enable recognition of a multi-touch input that is touched at a number of touch points simultaneously.

FIG. 2 is an exploded perspective view showing structure of a touch panel according to the present invention. As shown, a touch panel of a single substrate 30 is provided on the upper surface of a display device 20. The substrate 30 is made of a light transmission material such as glass or film. As shown, drive ICs (Integrated Circuits) 71 for applying a position detection signal and a gate signal to respective signal lines to be described later are mounted in edge portions of the substrate 30. The illustrated embodiment has been described with respect to a case that the drive ICs (Integrated Circuits) 71 are implemented as a single IC as an example, but the drive ICs (Integrated Circuits) 71 may be configured separately into ICs for sending and receiving or a gate IC may be also configured separately.

The drive ICs 71 are mounted at the edge portion of the substrate 30 in the form of a Chip On Film (COF) or a Chip On Glass (COG). In addition, the drive ICs 71 may be configured into an Amorphous Silicon Gate (ASG) in order to reduce a wiring area at the edge portions of the substrate 30. The ASG is a System On Glass (SOG) technology that implements a gate IC function on an amorphous silicon glass substrate in which the gate IC function can be implemented directly by the ASG on the glass substrate, and a gate installation area of the gate IC can be minimized. In addition, the drive ICs 71 can transmit a signal from the outside of the substrate 30 by using a Flexible Printed Circuit (FPC).

Meanwhile, a touch panel having the touch cell structure according to the present invention is made of a single substrate 30, and thus can be manufactured very slimly. Thus, a touch panel may not be provided on top of the display device 20, as shown in FIG. 2, but can be built in the display device 20. Despite the above-described built-in type design, features such as lightweight, thinness, shortening and compactness of the display device 20 are not greatly impeded. This is one of the important technological advantages of the present invention. For example, in the case of the LCD, a touch panel of a single substrate 30 and a polarizing plate are stacked on a liquid crystal panel in which a TFT substrate and a color filter substrate are bonded, and then are installed in the inside of a BLU housing. Accordingly, the touch panel can be embedded within the display device 20. As another example, the substrate 30 may be also provided as the same substrate as a color filter substrate. For example, touch cells which will be described later may be formed on the upper or lower surface of a color filter substrate.

Before explaining about a specific embodiment of this invention, a principle of detecting a non-contact touch input according to this invention will be briefly explained below with reference to FIG. 3. In FIG. 3, it is assumed that when a finger 25 or a conductive touch unit similar to the finger approaches to a conductive pad 50, a distance between the finger 25 and the conductive pad 50 is an interval "d" and a facing area is "A." An electrostatic capacitance "C" is formed between the finger 25 and the conductive pad 50 as shown in a right-side equivalent circuit of FIG. 3 and a numerical formula. If a voltage or current signal is applied to the conductive pad 50 having the electrostatic capacitance "C," charges of a magnitude "Q" can be accumulated and a voltage relationship formula is formed as V=Q/C. In this case, the human body is virtually grounded with respect to the earth.

If a predetermined signal is applied to the conductive pad 50 at a state where the finger 25 opposes the conductive pad 50 with an interval of "d," charges are charged in the electrostatic capacitance "C" that is formed between the conductive pad 50 and the finger 25. Here, as shown, since the switching device 40, preferably the gate terminal of the TFT is connected to the conductive pad 50, the TFT 40 is turned on for a time for charging the conductive pad 50 and discharging the signal accumulated in the electrostatic capacitance "C." The magnitude of the discharged signal becomes smaller gradually as time passes, and the TFT 40 is turned off if the electrostatic capacitance "C" is discharged to a degree.

The present invention detects non-contact touch inputs by using a phenomenon that the electric potential of the gate terminal of the TFT 40 by the electrostatic capacitance "C" that is formed between the touch unit and the conductive pad 50 is varied. Here, since the output signal with respect to the electric potential of the gate terminal of the TFT 40 appears as a logarithmic function as will be described later, the output of the TFT 40 has tens of times to tens of thousands of times an output difference depending upon whether or not a touch input exists. The present invention employs a P2G type touch cell structure that makes the electric potential of the conductive pad 50 determine the electric potential of the gate terminal of the TFT 40, and apparently differs from the conventional electrostatic capacitive type touch input device and touch cell structure.

FIG. 4 is a diagram showing a touch cell structure in accordance with a basic embodiment of the present invention. In FIG. 4, a touch panel having touch cells 60 with a resolution of 3*3 has been illustrated. The touch cells 60 are actually arranged in a much higher resolution but, for clarity of the present invention, a touch panel having touch cells 60 with a resolution of 3*3 will be illustrated as an example.

Referring to FIG. 4, a plurality of first signal lines 32, second signal lines 34 and auxiliary signal lines 37 are arranged on one surface of the upper substrate 30. The first signal lines 32 are lines for sending position detection signals (or charging signals) to the respective touch cells 60, and the second signal lines 34 are lines for receiving the position detection signals from the respective touch cells 60. The auxiliary signal lines 37 are lines for applying auxiliary signals for observing to the respective touch cells 60. In the illustrated embodiment, the first signal lines 32 and the second signal lines 34 are arranged in parallel with each other, and the auxiliary signal lines 37 are arranged crossing two signal lines 32 and 34. However, these signal lines have been illustrated only to help comprehension of this invention, but all the signal lines 32, 34 and 37 may be wired in parallel with each other or may be wired at a different wiring angle. In addition, each signal line can be wired in the form of an oblique pattern or a zigzag pattern.

In the embodiment of FIG. 4, each unit cell includes a conductive pad 50 and a three-terminal type switching device 40 whose gate terminal is connected to the conductive pad 50. The three-terminal type switching device 40 may be implemented into the aforementioned various switching devices, preferably a TFT 40. The TFT has been already validated in the field of Active Matrix LCD (AM-LCD), or AMLCD.

As shown, the conductive pad 50 is connected to the first signal line 32, and receives charging signal from the first signal line 32. The gate terminal of the TFT 40 is connected to the conductive pad 50, the drain terminal as an input terminal of the TFT 40 is connected to an auxiliary signal line 37, and the source terminal as an output terminal of the TFT 40 is connected to the second signal line 34.

The conductive pad 50 is formed of Indium Tin Oxide (ITO), Carbon Nano Tube (CNT), Antimony Tin Oxide (ATO), Indium Zinc Oxide (IZO), or a transparent conductive material having a conductive characteristic similar to that of the ITO, CNT, ATO, or IZO. The conductive pad 50 forms an electrostatic capacitance as it faces the bodily finger 25. The area of the conductive pad 50 functions as an important factor that determines an electrostatic capacitance that is generated at the time of a touch input. For example, as the area of the conductive pad 50 becomes large within the touch cell 60, the electrostatic capacitance that is generated at the time of a touch input becomes large.

A system configuration of the touch panel is illustrated at the lower portion of FIG. 4. As shown, a touch position detector 70 is provided at a one-side edge portion of the panel or the outside of the panel. The touch position detector 70 includes a drive IC 71, a timing controller 72, a signal processor 73, and a memory unit 74. The detection signal obtained from the touch position detector 70 is transferred to a CPU 75. The CPU 75 may be a CPU for the display device 20, main CPU of a computer device, or a CPU for the touch input device itself. Although it is not shown in the drawing, the system configuration further includes a power supply for generating a high or low voltage signal for the touch input detection.

The timing controller 72 generates a time-division signal of tens of milliseconds (ms) or less. The signal processor 73 applies a charging signal to each first signal line 32 via the drive IC 71. An observing auxiliary signal is applied to each auxiliary signal line 37. The signal received from the second signal line 34 is detected to thus acquire coordinates of the touch cell 60 where a touch input occurs.

The memory unit 74 is a unit of temporarily storing the acquired coordinate values. The illustrated embodiment shows a case that the touch cell 60 has a resolution of 3*3. However, since the touch cell 60 has a much higher resolution actually, signals may be lost during processing of many signals. For example, when the signal processor 73 is in a "busy" state, it may not recognize the position detection signal to thus miss the signal. The memory unit 74 prevents the loss of signals as described above.

FIG. 5 is a block diagram conceptually showing an embodiment of the memory unit. Referring to FIG. 5, the memory unit 74 has absolute addresses corresponding to the coordinates of the touch cell 60. To this end, the memory unit 74 has the number of bits greater than the number of the touch cells 60. If a touch input occurs at the right-lower portion in the touch cell of the embodiment of FIG. 4, the signal processor 73 stores the obtained coordinates in an "m9" address of the memory unit 74 as shown in a dotted line in FIG. 5, and reads the memory unit 74 after having scanned the whole signals once, to thus determine whether or not any missing signal or signals exist. If a signal corresponding to the coordinate in the m9 address has been missed, but has been stored in the m9 address of the memory unit 74, the corresponding signal is generated as a normal input signal and erases the memory unit 74 prior to a next scanning operation.

FIG. 6 is a plan view showing a configuration of touch cells according to a preferred embodiment of the present invention, which shows an example that two switching units 42 and 44 are included in a touch cell 60. The embodiment of FIG. 6 shows an example that the signal processing becomes easier and the multi-touch input is recognized stably.

As shown in FIG. 6, a plurality of gate signal lines 36 are further provided on one surface of the substrate 30. A basic circuit configuration that each touch cell 60 includes a conductive pad 50 and a switching unit 44 whose gate terminal is connected to the conductive pad 50 is the same as that of the embodiment of FIG. 4, but a switching unit 42 for supplying the conductive pad 50 with a charging signal is further provided for the basic circuit configuration. The latter switching unit 42 is a first switching unit 42 and the former switching unit 44 is a second switching unit 44. Preferably, both the two switching units 42 and 44 are TFTs, respectively.

Referring to FIG. 6, the input terminal of the first TFT 42 is connected to a first signal line 32, the output terminal thereof is connected to the conductive pad 50, and the gate terminal thereof is connected to a gate signal line 36. The gate terminal of the second TFT 44 is connected to the conductive pad 50 and the input and output terminals thereof are connected to an auxiliary signal line 37 and a second signal line 34.

In the embodiment of FIG. 6, a touch position detector 70 sequentially applies a scan pulse to each gate signal line 36, so sequentially turns on the first TFT 42, or turns on a gate signal at the same time, to thus induce the electrostatic capacitance between the finger 25 and the conductive pad 50 to be charged and then applies a scan poise to the auxiliary signal line 37 to determine the touch position.

FIG. 7 is a plan view showing structure of a unit touch cell structure in the embodiment of FIG. 6, and FIG. 8 is a cross-sectional view cut along a line I-II of FIG. 7. The structure of the unit touch cell 60 will be described in more detail with reference to FIGS. 7 and 8 as follows. Referring to FIG. 7, a first TFT 42 and a second TFT 44 are connected to a conductive pad 50 and signal lines as shown in the circuit diagram of FIG. 6. As an embodiment, the signal lines are preferably formed of aluminum series metal such as aluminum and aluminum alloys, silver series metal such as silver and silver alloys, copper series metal such as copper and copper alloys, molybdenum series metal such as molybdenum and molybdenum alloys, chrome, titanium, and tantalum. A first signal line 32, a second signal line 34, a gate signal line 36 and an auxiliary signal line 37 may include two films having respectively different physical properties, that is, a lower film (not shown) and an upper film (not shown) on the lower film. The upper film is made of metal of a low specific resistivity, for example, aluminum series metal such as aluminum and aluminum alloys, so as to reduce signal delay or voltage drop. In contrast, the lower film is made of a material having an excellent contact feature with respect to Indium Tin Oxide (ITO) and Indium Zinc Oxide (IZO), for example, molybdenum (Mo), molybdenum alloys, chromium (Cr), etc.

The signal lines are preferably formed of a transparent conductive material, and thus are prevented from being seen by observers. Although it is not shown in the drawings, when the signal lines are formed of the transparent conductive material, metal series signal lines may be used in part in order to insulate between the signal lines at the intersection of the signal lines and reduce resistance of the signal lines. In addition, although it is not shown in the drawings, the signal lines may be protected with insulation films. If the signal lines are made of the transparent material, the signal lines may not be only prevented from being seen, but a moire phenomenon due to an optical interference with a black matrix (BM) that is formed between the signal lines (for example, such as a gate line and a source line of LCD) or pixels for screen display of the display device to thus conceal the signal lines may be also prevented. The signal lines that are formed in different kinds of layers are connected with other components via contact holes 59.

Referring to FIG. 8, a gate insulation film 43 made of silicon nitride (SiNx) is formed on the gate terminal 56 of the first TFT 42 and the second TFT 44, respectively. An active layer 46 is formed on top of the gate insulation film 43 in which the active layer 46 overlaps the gate terminal 56 and forms a channel between the drain terminal 57 and the source terminal 58. In addition, the active layer 46 is also formed to overlap the drain terminal 57 and the source terminal 58. The active layer 46 is formed of hydrogenated amorphous silicon or polycrystalline silicon. An ohmic contact layer 47 made of a material of n+ hydrogenated amorphous silicon in which high concentrations of silicide or n-type impurities are doped is formed on the active layer 46. The ohmic contact layer 47 is a layer for ohmic contact between the drain terminal 57 and the source terminal 58. A protective film 45 is formed on the drain terminal 57 and the source terminal 58, respectively. A conductive pad 50 that is formed of a transparent conductive material such as ITO is located on the upper surface of the protective film 45.

As shown, in order to connect the conductive pad 50 to the source terminal 58 of the first TFT 42 and the gate terminal 56 of the second TFT 44, the contact holes 59 are used. The contact holes 59 can be made into different shapes such as a polygon or circle.

Although it is not shown in the drawings, light shield layers for blocking light can be formed on the TFTs 42 and 44. The material that is used to manufacture the drain terminal 57 and the source terminal 58 of the TFTs 42 and 44 or the material that is used to manufacture the gate terminal 56 can be used as the light shield layers. The light shield layers prevent the TFTs 42 and 44 from malfunctioning in response to light.

FIG. 9 is a waveform diagram illustrating an example of detecting touch inputs according to the embodiment of FIG. 6. Referring to FIG. 9, the touch position detector 70 offers a scan pulse sequentially to each gate signal line 36. The gate signal Gn offered by the touch position detector 70 has a voltage level of a sufficient size so that the gate terminal of the first TFT 42 enters an active area. For example, the gate signal Gn is preferably set to be larger by 3V or higher than the position detection signal Dn that is transmitted via the first signal line 32. In the case of a preferred embodiment of the present invention, the high (Hi) voltage level of the position detection signal Dn is 13V and the high (Hi) voltage level of the gate signal Gn is 18V. In addition, in order to turn off the first TFT 42 stably, the gate OFF voltage is set to be at a range of −5 to −7V.

The gate signal Gn has enough observation time between the respective signals. This is to make the virtual capacitor formed between the finger of the human body and the conductive pad 50 according to an approach of the human body, have a sufficient charging time. As illustrated, a pause period of a sufficient observation time 1 is given between the gate signals G1 and G2. In the case that any one of the gate signals Gn is at a high state (Hi), the position detection signal Dn that is applied through the first signal line 32 is offered to keep a high state (Hi) necessarily. Preferably, when one gate signal Gn is at a pause period, the position detection signal Dn also has a slight pause period.

The touch position detector 70 offers an observation voltage through the auxiliary signal lines 37. The auxiliary signal Auxn that is applied through the auxiliary signal line 37 should be necessarily at a high level at a part of an interval of the observation time, but may be always offered at a high level at the whole interval of the observation time. The auxiliary signal Auxn offers an observation voltage lower by 3V or more than 13V that is a voltage that is charged between the finger 25 and the conductive pad 50 by the position detection signal Dn at a high (Hi) level. For example, it is enough that the observation voltage of the auxiliary signal Auxn is about 5V.

Referring to FIG. 9, the waveform that is obtained through the second signal lines 34 and the process of acquiring the touch signal through the waveform will follow.

If a human body does not approach although the gate signal has been applied and then the observation time has passed, as in the case that the gate signals G1 and G2 are applied, the signals Sn that are obtained through the second signal lines 34 have the waveform illustrated. This is because the electrostatic capacitance is not formed in the conductive pad 50 since the human body has not approached. In more detail, when the gate signal G1 is applied, the first TFT 42 is turned on. In this case, since the position detection signal Dn is applied to the gate terminal of the second TFT 44, the second TFT 44 is also turned on. By the way, because wiring resistance and parasitic electrostatic capacitance of the second signal line 44 exist, the signals S1 and S2 that are received as illustrated have a curved line in a section ascending up to a high (Hi) level and a section descending down to a low (Lo) level, respectively. As illustrated, it is assumed that a time taken from the immediate time after the first TFT 42 has become turned off by the gate signal G1 and has been changed into an observation time, to the time the gate voltage of the second TFT 44 descends sharply and the signal Sn that is obtained descends at a low (Lo) level perfectly, is "T1." Here, a time delay that occurs in the output signals Sn in comparison with the input signals Dn in the waveform diagram of FIG. 9 has been ignored.

If a bodily approach is achieved to a right-lower touch cell 60 of FIG. 6 at a certain point in time, an electrostatic capacitance will be formed between the conductive pad 50 and the bodily finger 25 in the corresponding touch cell 60. As can be seen from the waveform of FIG. 9, if a touch occurs in a section where the gate signal G3 is at a high (Hi) level, a virtual capacitor is formed at a moment the bodily finger 25 approaches to the conductive pad 50. Here, as the waveform of S3 is distorted at a touch occurrence point in time in the waveform diagram of FIG. 9, charge voltage can be varied at a charge beginning time. However, the S3 waveform rises up to a high (Hi) level as soon as charging is ended.

By the way, in the case that the mode of the G3 signal is changed into an observation time, that is, in the case that the G3 signal is turned off, voltage that is charged in the virtual capacitor is discharged, and the gate voltage of the second TFT 44 descends slowly. As can be seen from the S3 waveform, the output waveform of the second TFT 44 exhibits a unique output characteristic. Here, a time that is taken for the Sn waveform to fall down to 50% or below is assumed as "T2."

Referring to the waveform diagram of FIG. 9, it can be seen that the time points T1 and T2 have a considerable time difference therebetween. The touch position detector 70 can acquire a touch signal by reading a time that is taken for the waveform of the signal Sn that has been obtained through the second signal line 34 after the gate signal Gn has been turned off as described above to descend or descending voltage (or current) at a certain point in time.

The embodiment of FIG. 9 is one embodiment for acquiring a touch signal. It is possible to acquire the touch signal by an alternative method that differs from the FIG. 9 embodiment. For example, according to the alternative method, after all the gate signals Gn have been turned on all at once, to thus induce the virtual capacitor formed between the human body and the conductive pad 50 to be charged, signals are sequentially applied to the auxiliary signal lines 37 to thereby observe output waveform. It is obvious to one of ordinary skill in the art that the method of acquiring the touch signal can be implemented in various forms according to the technological spirit of the present invention.

FIGS. 10 and 11 are configurational diagrams illustrating other embodiments of the present invention, respectively, which show an example that an additional auxiliary capacitor 54 is added between the conductive pad 50 and the ground in each touch cell 60. The added auxiliary capacitor 54 shares charges with the virtual capacitor that is formed by the finger 25 of the body. Accordingly, the gate potential of the second TFT 44 will be dropped or the charging time will become longer. Therefore, a touch signal can be acquired more stably with respect to the approach of the finger 25 by detecting the gate potential of the second TFT 44 or the charging time.

Referring to FIG. 10, the auxiliary capacitor 54 is further connected between the conductive pad 50 and the auxiliary signal line 37, in addition to the embodiment of FIG. 6. Even in this embodiment, the touch position detector 70 may offer a scan pulse sequentially to each gate signal line 36, or may apply an identical gate signal to all the gate signal lines 36.

In this embodiment, the gate signal Gn and the auxiliary signal for observation Auxn do not necessarily need to interoperate, but can be applied independently. However, if too much time has elapsed after the auxiliary capacitor 54 has been charged by the gate signal Gn, the auxiliary capacitor 54 may be freely discharged to thus cause failure of observation. Accordingly, it is desirable that the auxiliary signal Auxn should be applied immediately after the auxiliary capacitor 54 has been charged by the gate signal Gn.

As an embodiment, the turn-on (ON) voltage of the gate signal Gn is set to be 15V. When the gate signal Gn is applied, even the position detection signal Dn is also applied, and the auxiliary capacitor 54 connected to the gate terminal of the second TFT 44 is charged. The Hi-level potential of the position detection signal Dn is a voltage that turns on the second TFT 44, and thus is appropriately about 10V considering the relationship with respect to the gate signal Gn. The position detection signal Dn is offered for a sufficient time so as to charge the auxiliary capacitor 54.

Since the gate voltage of the second TFT 44 is greater by 3V or more than the voltage of the input terminal Auxn, the second TFT 44 is always turned on. If an approach of the finder 25 is achieved at the right-lower portion of the touch cell 60 at a point in time when the auxiliary signal Auxn for observation is applied, the charges stored in the auxiliary capacitor 54 are discharged to then move to the virtual capacitor formed by the human body. This will continue until the two capacitors are in the same potential. If the electrostatic capacitance of the auxiliary capacitor 54 is sufficiently smaller than that of the virtual capacitor formed by the finger 25, the charge sharing occurs and a point in time when the second TFT 44 is not turned on or the size of the output signal Sn is degraded takes place in the size relationship between the voltage applied to the gate terminal of the second TFT 44 and the auxiliary voltage Auxn, to then be read and to thus acquire a touch signal. In this example, the acquired touch signal has a coordinate value corresponding to "D3, S3."

Referring to FIG. 11, an auxiliary signal line 37 is provided with a first auxiliary signal line 37*a* and a second auxiliary signal line 37*b*. In addition, one end of the auxiliary capacitor 54 is connected to the first auxiliary signal line 37*a* and the input terminal of the second TFT 44 is connected to the second auxiliary signal line 37*b*. The present embodiment of FIG. 11 differs from the embodiment of FIG. 10, only in a point of view that an auxiliary signal for observation and an auxiliary signal for state monitoring are used instead of a single auxiliary signal, but the former is the same as the latter in the rest points of view. An auxillary signal Aux1-*n* is applied to the first auxiliary signal line 37*a* for observation and an auxiliary signal Aux2-*n* is applied to second auxiliary signal line 37*b* for state monitoring.

In this embodiment, the turn-on (ON) voltage of the gate signal Gn is set to be 18V. The high level potential of the position detection signal Dn is a voltage that turns on the second TFT 44, and thus is appropriately about 12V. As an example, the auxiliary signal for observation Auxin may have a potential of −18V at a low level, and 0V at a high level. For example, when the auxiliary signal Aux1-*n* is at a low level and the auxiliary capacitor 54 has been charged, the gate potential of the second TFT 44 drops down to −6V. Accordingly, the second TFT 44 is not turned on with respect to the second auxiliary signal line 37*b* having a potential which is larger than the gate potential of the second TFT 44. In addition, since the high level potential of the position detection signal Dn is 12V at a high level (that is, zero volt) of the auxillary signal Aux1-*n*, it is ensured that the second TFT 44 is stably turned on with respect to the auxiliary signal Aux2-*n* which is less by 3V than the high level potential of the position detection signal Dn. The auxiliary signal Aux2-*n* is preferably synchronized with the auxiliary signal Aux1-*n*. The potentials at a high level and a low level of the auxiliary signal Aux2-*n* are preferably the same as those of the auxiliary signal Aux1-*n*.

In the FIGS. 10 and 11 embodiments, the electrostatic capacitance of the auxiliary capacitor 54 may be selected in various forms, and the voltage applied to the gate terminal of the second TFT 44 may be adjusted after having performed the charge sharing, which becomes a factor that determines a descending slope of the waveform of the Sn signal when a touch operation occurs. In other words, by adding the auxiliary capacitor 54, the width of selecting the voltage level of each signal is widened and the descending slope of the Sn signal is made to become more gradual, to thus obtain a touch signal stably.

The above-described embodiments show touch cell structures in accordance with the present invention. Each touch cell 60 basically consists of a pad to gate (P2G) mode, in which some components can be added to this basic configuration. In addition to the above-described embodiments, each touch cell 60 may further includes additional switching devices, capacitors, resistors, or other electrical devices. Here, a very high detection sensitivity and accuracy and an ability of detecting touch inputs at a digital mode may be listed as the technical characteristics of each touch cell 60 having the above-described pad to gate (P2G) mode since a kick back at the gate terminal of the switching device 40 greatly varies depending on whether or not a touch input exists, and the output signal of the switching devices 40 has tens of times or tens of thousands of times a difference depending upon a kick back difference due to the touch input.

An example of detecting touch inputs using a kick back in the touch cell structure according to the present invention will be now described below. The following symbols C1 and C2 denote names and capacities of capacitors, respectively. For example, the symbol "C1" denotes a capacitor named as C1, and at the same time denotes a capacitance of C1 in size.

FIG. 12 is a cross-sectional view showing an example of capacitors internally designed in a TFT. Referring to FIG. 12, capacitors Cgd and Cgs are formed between the gate and drain terminals of the TFT and between the gate and source terminals thereof, respectively, during manufacturing TFTs. As shown, the capacitor Cgd is formed in an area where the drain terminal 57 and the gate terminal 56 overlap, and the capacitor Cgs is formed in an area where the source terminal 58 and the gate terminal 56 overlap. The capacities of the capacitors Cgd and Cgs are determined depending upon width or length of the TFT. For example, the capacitors Cgd and Cgs are designed to 10 fF (femto F) to 300 fF or so depending upon width or length of the TFT. Otherwise, the capacitors C1 and C2 may be externally mounted but will be described later. In this case, the capacitors C1 and C2 are designed to 10 fF to 100 uF.

FIG. 13 shows a configuration of a touch cell illustrating a state where capacitors are internally designed in a TFT, FIG. 13 illustrates an example of a state where a built-in capacitor is added in each of the first TFT 42 and the second TFT 44 in the touch cell structure of the FIG. 6 embodiment. As shown, a virtual capacitor Ct is formed between the bodily finger 25 and the conductive pad 50, at the time of occurrence of a touch input. A signal output through the output terminal of the first TFT 42 is stored in the virtual capacitor Ct for a certain amount of time. The signal accumulated in the virtual capacitor Ct is discharged through a discharge path formed by peripheral devices that are connected to the virtual capacitor Ct.

As illustrated, built-in capacitors C1, C2, and C3 of each TFT function in a circuit configuration that determines the potential of the gate terminal of the second TFT 44 according to the charging and discharging operations of the virtual capacitor Ct. Here, the built-in capacitors C1, C2, and C3 are about 10 fF to 100 uF, as described above. The virtual capacitor Ct may be designed freely by adjusting an interval and a facing area between a touch unit and the conductive pad 50. For example, if a large area of the conductive pad 50 is selected, the virtual capacitor Ct is also designed to have a large capacitance based on the equation of FIG. 3. Conversely, if a small area of the conductive pad 50 is selected (for example, 1 mm$^2$ or less), the virtual capacitor Ct is designed to have a small capacitance. Preferably, the virtual capacitor Ct is selected to have a value equivalent to or a larger value by several hundred times than those of built-in capacitors C1, C2, and C3. However, in some cases, the virtual capacitor Ct may be selected to have a smaller value by hundreds of times than those of built-in capacitors C1, C2, and C3. For example, the virtual capacitor Ct may be designed to be tens of femto Faraday (fF) or tens of micro Faraday (uF).

FIG. 14 is a waveform diagram illustrating examples of kick back waveform depending upon whether or not a touch input exists, and illustrates signal waveform in the touch cell structure of FIG. 13. Referring to FIG. 14, a kick back difference depending on whether or not a touch input exists will be described below.

When a turn-on voltage that is applied to the gate terminal of the first TFT 42 is "VH" and a turn-off voltage thereof is "VL," a difference in voltage according to the turn-on and turn-off of the gate terminal of the first TFT 42 becomes a value that is obtained by subtracting the turn-off voltage "VL" from the turn-on voltage "VH." When the first TFT 42 is turned on by applying a voltage of "V1" in magnitude to the input terminal "In1" of the first TFT 42 and applying a voltage of "VH" in magnitude to the gate terminal "Cont1" of the first TFT 42, a voltage measured at the output terminal "Out1" of the first TFT 42 is a voltage of "V2" as shown as waveform of "Out1-A," in the case that no touch input occurs in the conductive pad 50. Here, transient response characteristics due to wiring of signal lines, parasitic resistance, etc., are ignored. When the first TFT 42 is turned off by applying the turn-off voltage "VL" to the gate terminal "Cont1" of the first TFT 42 after a predetermined time elapses, a voltage measured at the output terminal "Out1" of the first TFT 42 drops in voltage. Here, since the built-in capacitors C1, C2, and C3 are connected as shown in the FIG. 13 circuit diagram, a kick back voltage "KB1" at the time when no touch input occurs in the waveform of "Out1-A" is defined as the following equation (1).

$$KB1 = (VH - VL)\frac{C1}{(C1 + C2 + C3)} \quad (1)$$

For example, if VH is 10V, VL is −5V, V1 is 8V, and C1 equals the sum of C2 and C3, the kick back voltage "KB1" is 7.5V. In other words, V2 drops from 8V to 0.5V in the waveform of "Out1-A." In addition, this voltage drop means that the potential of the conductive pad 50 drops from 8V to 0.5V.

Meanwhile, in FIG. 14, the waveform marked as "Out1-B" indicates waveform of a voltage measured at the output terminal "Out1" of the first TFT 42, in the case that a touch input occurs according to an approach of the finger 25 with respect to the conductive pad 50. Other conditions are the same as the above-described case, but since the electrostatic capacitance Ct is formed between the finger 25 and the conductive pad 50, a kick back voltage "KB2" at the time when a touch input occurs in the waveform of "Out1-B" is defined as the following equation (2).

$$KB2 = (VH - VL)\frac{C1}{C1 + C2 + C3 + C4} \quad (2)$$

If Ct has three times the size of C1 the kick back voltage KB2 is 3V. Namely, V2 drops in the waveform of Out1-B from 8V to 5V.

In the FIG. 14 embodiment, Out2-A and Out2-B illustrate the size of the signal (the current value in this example) output from the output terminal Out2 of the second switching unit 44. It can be seen that Out2-A and Out2-B have similar types of waveforms to those of Out1-A and Out1-B, respectively.

As noted earlier, the size of Ct can be selected by adjusting a gap and the facing area between the touch unit and the conductive pad 50. The value of the denominator of KB2 becomes large at a high magnification in comparison to KB1 so that Ct can be designed at a high magnification in comparison to C1. Accordingly, a difference between KB1 and KB2 can increase greatly.

FIG. 15 is a graphical view showing a gate voltage versus output current characteristic of a TFT. Referring to FIG. 15, it can be seen that the output signal of the TFT has a logarithmic function in correspondence to the signal applied to the gate terminal of the TFT. Referring to the 15, when a control voltage Vgs applied to the gate terminal of the TFT is 15V, Ids of about 1 uA flows between the drain and source terminals of the TFT. Meanwhile, when Vgs is 0V, it can be seen that Ids of 100 pA flows. In other words, when the control voltage voltage-drops from 15V to 0V, the output current has about ten thousand times the difference.

In other words, a difference between KB1 and KB2 can be properly selected by appropriately selecting C1, C2, C3, and the magnifications of Ct considering C1, C2, and C3, and accordingly the output signal of the second TFT 44 may make tens of times to tens of thousands of times a difference. Thus, the present invention has technical advantages that touch inputs can not only be easily detected, but also very high detection accuracy and reliability are ensured, and the touch inputs can be detected at a digital mode that detects a high/low level of a signal. In addition, width or breadth of the touch cell 60 can be taken on a very small scale by these technical advantages.

Meanwhile, in the above-described embodiment, a TFT has been referred to as a switching device 40. The built-in capacitors exist in the TFT due to the structure that gate metal and source metal are laminated as shown in FIG. 12, but in the case that the TFT is substituted with the other switching device (where a built-in capacitor does not exist) other than the TFT, a kick back effect can be obtained by adding a capacitor to the switching device 40 as shown in FIG. 13. In addition, in the above-described embodiment, a voltage driven type TFT has been referred to but the driving method and detection method may vary in the case that the TFT is replaced by the other switching device. For example, switching devices such as BJT or IGBT operate at a current-driven mode, and output tens of times or more current in comparison with the current applied to the control terminal. Therefore, the switching devices such as BJT or IGBT are given a kick back difference depending on whether or not a touch input occurs, respectively, and thus obtain an output current characteristic tens of times or more in comparison with a control current of a small difference.

FIG. 16 is a diagram showing an example of detecting a touch input using a comparator, and FIG. 17 is a waveform diagram illustrating waveform at the time of detection using a comparator. FIGS. 16 and 17 show an example of recognizing a touch input by detecting a high/low level of the output signal of the second TFT 44 at a digital mode. As shown in FIG. 16, the signal Sn output from the second TFT 44 is input to the comparator and is compared with a reference signal. As noted earlier, since a difference of the output signal output from the second TFT 44 becomes large depending on whether or not a touch input occurs, the comparator can obtain a comparison result very easily. In addition, the output of the comparator is a digital signal having a high or low level. The touch position detector 70 can read the digital signal without additional signal conversion.

For example, as shown in FIG. 17, when a touch input occurs and the output signal Sn of the second TFT 44 becomes high at an interval of t1, Sn gets greater than a reference signal and the output of the comparator becomes high or low depending on configuration of the circuit. Sn drops to a low level, at an interval of t2 where a touch input is interrupted or a signal will be extinguished after a specified time interval. In this case, Sn is smaller than the reference signal, and the output of the comparator becomes high or low depending on configuration of the circuit. Thus, the touch position detector 70 can process the output of the comparator in a digital mode. Here, although the difference between the high and low states of Sn seems to be small in the illustrated example, this difference gains tens of times to tens of thousands of times, as described above.

In the case that the touch input is detected by using the comparator as shown in the FIGS. 16 and 17 examples, the reference signal is used. The reference signal can be generated by the touch position detector 70 including a separate reference signal generator.

However, a given constant reference signal can cause a reading error with respect to the touch input. For example, it is assumed that the characteristic of the first TFT 42 varies due to factors such as temperature or aging and thus a voltage fluctuation of 2V or so occurs at Vgs for producing the same output current. Referring to the FIG. 15 graph, the difference of the output current Ids gains one hundred times at an interval where Vgs is changed from zero (0) to 2V or so. If it is detected whether or not a touch input occurs based on a difference between when Vgs is zero (0) and when Vgs is 15V, the Ids difference gains ten thousands of times. Accordingly, the reference signal can be determined as an intermediate value (that is, a current value of one hundred times a difference) of the output signal of the second TFT 44 depending upon whether or not a touch input occurs. That is, the reference signal can be set as a current value at Vgs of 2V. Here, the intermediate value does not necessarily mean a central value. For example, a current value with ten times the difference or one thousand times the difference may become the reference value.

By the way, when the output voltage of the first TFT 42 changes by 2V, the output of the second TFT 44 approaches the reference signal although no touch input occurs. Here, malfunction may occur due to an influence of disturbances, in which it is misrecognized as if a touch input were detected although no touch input occurs.

The present invention uses a sensing cell 61 in order to prevent malfunction according to setting of the reference signal. The sensing cell 61 is installed on the panel, and is configured into a similar structure to the touch cell 60 for detection of the touch input. The sensing cell 61 having a structure similar to the touch cell 60 has the same temperature conditions and aging as the touch cell 60. For example, when the TFT of touch cell 60 changes by 2V in voltage due to changes of temperature and aging, the sensing cell 61 also generates a reference signal of the same voltage fluctuations as that of the TFT. Therefore, reading errors due to factors such as temperature and aging can be reduced.

FIGS. 18 and 19 show an example of the sensing cell 61, respectively. As shown in the FIGS. 4 and 6 embodiments, the touch input can be detected through the output signal of the TFT 40 or second TFT 44. In the FIG. 18 embodiment, the sensing cell 61 can be configured into a single sensing switching device 64 in correspondence to the case that the output signal is obtained via the single TFT as described above. In this example, the sensing switching device 64 is a TFT (hereinafter, called as a sensing TFT 64), and is given as the same reference numeral.

In some cases, an additional TFT can be further added at the rear end of the TFT 40 or second TFT 44. In this case, as shown in FIG. 19, the sensing cell 61 may be configured to have a first sensing TFT 66 and a second sensing TFT 68 that are connected in sequence. In the illustrated example, although an installation location of the sensing cell 61 is not specified, the sensing cell 61 may be installed in a non-active area on the panel.

The sensing TFT 64 that constitutes the sensing cell 61 has the same circuit configuration as that of the TFT 40 or second TFT 44 that is provided at the rear end of the touch cell 60 of the conductive pad 50. The drain terminal of the sensing TFT 64 is connected to the auxiliary signal line 36 and the source terminal thereof is connected to the second signal line 34. However, the conductive pad 50 is not connected to the gate terminal of the sensing TFT 64, and a separate gate signal can be applied to the gate terminal thereof. As another example, a TFT having the same circuit configuration as that of the first TFT 42 may be added to the gate terminal thereof.

The touch position detector 70 applies a predetermined control signal to the gate terminal of the sensing TFT 64. This control signal corresponds to an intermediate value between a signal applied to the control terminal of the second TFT 44 of the touch cell 60 at the time of occurrence of no touch inputs and a signal applied to the control terminal of the second TFT 44 of the touch cell 60 at the time of occurrence of touch inputs. For example, in the above-described example, 2V is applied to the control terminal of the sensing TFT 64. If 2V is applied to the gate terminal of the sensing TFT 64, the output of the sensing TFT 64 will correspond to value of the Ids in the case that Vgs is 2V. However, if the TFT of the touch cell 60 causes voltage fluctuations due to changes of the temperature or aging, the sensing TFT 64 also causes voltage fluctuations under the same condition. Accordingly, the reference signal output from the sensing TFT 64 also changes. Therefore, malfunctions due to the above temperature conditions and aging and reliably can be prevented and touch inputs can be stably detected.

The invention has been described with respect to the preferred embodiments. However, the invention is not limited to the above embodiments, and it is possible for one who has an ordinary skill in the art to make various modifications and variations without departing off the spirit of the invention defined by the claims.

The invention claimed is:

1. A touch panel comprising:
   a light transmissive substrate;
   touch cells that are arranged in a matrix form on the light transmissive substrate and located in an active area of the light transmissive substrate, in which each touch cell comprises:
      a conductive pad;
      a first three-terminal type switching device whose gate terminal is connected to a first signal line and whose output terminal is connected to the conductive pad, and configured to be turned on/off according to a control signal applied to a gate terminal of the first three-terminal type switching device, thereby supplying a charging signal to the conductive pad; and
      a second three-terminal type switching device whose gate terminal is connected to the conductive pad and whose output signal is changed in correspondence to a change in electric potential of the gate terminal of the second three-terminal type switching device by an electrostatic capacitance between a finger of a human body or a touch unit having an electrical characteristic similar to the finger and the conductive pad; and a touch position detector that recognizes a touch input from the output signal of the second three-terminal type switching device, wherein the electric potential of the gate terminal of the second three-terminal type switching device depends on a kick back difference between at the time when no touch input occurs and at the time when a touch input occurs, and wherein the first signal line is a signal line for applying a charging signal to the conductive pad, the control signal is applied by a second signal line other than the first signal line, and a multi-touch input is recognized by sequentially conducting the first three-terminal type switching device with sequentially applied scan pulse.

2. The touch panel according to claim 1, further comprising first and second capacitors that are connected between the gate terminal and the output terminal of the first three-terminal type switching device and the second three-terminal type switching device, respectively.

3. The touch panel according to claim 2, wherein the first capacitor connected between the gate terminal and the output terminal of the first three-terminal type switching device is in the range of 10 fF to 100 uF.

4. The touch panel according to claim 2, wherein the first capacitor connected between the gate terminal and the output terminal of the first three-terminal type switching device is selected to have a smaller value by twice to several hundreds of times than a value of an electrostatic capacitor formed between the touch unit and the conductive pad.

5. The touch panel according to claim 2, wherein the first capacitor connected between the gate terminal and the output terminal of the first three-terminal type switching device is selected to have a value equal to or greater than a value of an electrostatic capacitor formed between the touch unit and the conductive pad.

6. The touch panel according to claim 2, wherein the first and second capacitors are built in the first three-terminal type switching device and the second three-terminal type switching device, respectively.

7. The touch panel according to claim 2, wherein the first and second capacitors are provided in the outside of the first three-terminal type switching device and the second three-terminal type switching device, respectively.

8. The touch panel according to claim 2, further comprising a third capacitor connected between an input terminal and the gate terminal of the second three-terminal type switching device.

9. The touch panel according to claim 1, wherein the first and second three-terminal type switching devices are any one selected from the group consisting of a relay, a MOS (Metal Oxide Semiconductor) switch, a BJT (Bipolar Junction Transistor) switch, a FET (Field Effect Transistor), a MOSFET (Metal Oxide Semiconductor Field Effect Transistor) switch, an IGBT (Insulated Gate Bipolar Transistor) switch, and a TFT (Thin Film Transistor) switch.

10. The touch panel according to claim 1, wherein the touch position detector applies an on/off control signal to the gate terminal of the first three-terminal type switching device, applies a position detection signal to an input terminal thereof, and compares a difference of the output signal of the second three-terminal type switching device according to a difference of a kick back depending upon whether or not a touch input exists, to thus recognize the touch input.

11. The touch panel according to claim 10, wherein the output signal of the second three-terminal type switching device has tens of times or tens of thousands of times a difference depending upon whether or not a touch input exists.

12. The touch panel according to claim 10, further comprising a comparator for comparing the output signal of the second three-terminal type switching device and a reference signal.

13. The touch panel according to claim 12, further comprising a sensing cell, wherein the sensing cell includes a three-terminal sensing switching device, which has the same circuit configuration as the second three-terminal type switching device but to a gate terminal of which the conductive pad is not connected, and is provided at one side of the light transmissive substrate, wherein the touch position detector applies a control signal corresponding to a value positioned between a signal applied to the gate terminal of the second three-terminal type switching device of the touch cell at the time of no occurrence of touch inputs and a signal applied to the gate terminal of the second three-terminal type switching device of the touch cell at the time of occurrence of touch inputs, to the gate terminal of the three-terminal sensing switching device, the same signal as the signal applied to an input terminal of the second three-terminal type switching device is applied to an input terminal of the three-terminal sensing switching device, and a signal output from an output terminal of the three-terminal sensing switching device is used as the reference signal of the comparator.

14. The touch panel according to claim 1, wherein the touch position detector further comprises a memory unit having addresses corresponding to coordinates of the touch cell, in which if a touch input is detected, coordinate values of the corresponding touch cell are stored in the corresponding addresses of the memory unit.

* * * * *